Oct. 27, 1925.

V. D. SIMONS 1,558,936

ELECTRICAL CONTROL FOR PAPER MACHINES

Filed July 15, 1920     5 Sheets-Sheet 1

Oct. 27, 1925.

V. D. SIMONS 1,558,936

ELECTRICAL CONTROL FOR PAPER MACHINES

Filed July 15, 1920   5 Sheets-Sheet 2

Oct. 27, 1925.  
V. D. SIMONS  
1,558,936  
ELECTRICAL CONTROL FOR PAPER MACHINES  
Filed July 15, 1920   5 Sheets-Sheet 4

WITNESSES:

INVENTOR  
Venning D. Simons.  
BY  
ATTORNEY

Oct. 27, 1925.

V. D. SIMONS 1,558,936

ELECTRICAL CONTROL FOR PAPER MACHINES

Filed July 15, 1920  5 Sheets-Sheet 5

WITNESSES:

INVENTOR
Venning D. Simons.
BY
ATTORNEY

Patented Oct. 27, 1925.

1,558,936

UNITED STATES PATENT OFFICE.

VENNING D. SIMONS, OF CHICAGO, ILLINOIS.

ELECTRICAL CONTROL FOR PAPER MACHINES.

Application filed July 15, 1920. Serial No. 396,525.

*To all whom it may concern:*

Be it known that I, VENNING D. SIMONS, a citizen of the United States, residing at Chicago, in the county of Cook and State of Illinois, have invented certain new and useful Improvements in Electrical Controls for Paper Machines, of which the following is a specification.

This invention relates to improvements in electrical control methods and apparatus, adapted particularly for controlling the operation of the driving motors for the rolls of paper making machines.

The principal object of the present invention is to provide improved means and an improved method for securing a constant or predetermined speed of operation of each section of a paper machine.

Another object is to provide improved electrical apparatus for maintaining a predetermined speed relation between the rolls of a paper machine or the like.

It has been the practice heretofore to drive the rolls in different sections of a paper machine by means of a number of direct current motors which are usually directly connected to the rolls. Owing to variations in the load, temperature changes, etc., it has been difficult to maintain a uniform speed of operation of the rolls in the different sections of the machine with the result that the paper passing over the rolls has been subjected to an undue tension or has become slack in the region between adjacent rolls.

These objections have been overcome in the present invention by providing a series of alternating current synchronous motors, each of which acts as a pilot, or speed maintaining motor for an associated direct current driving motor. Two or more of these direct current motors may be maintained at constant speed for example by directly connecting a comparatively small alternating current synchronous motor to the shaft of each direct current motor and then driving the synchronous motors in parallel from a common alternating current supply or tying them together electrically to allow one alternating current motor to drive the other. Since a synchronous motor runs at a constant speed at all loads, these two or more synchronous motors, which are electrically connected, and which have similar characteristics, and are driven by a current of the same frequency, will maintain the direct current motors at a constant or predetermined speed and will overcome any irregularities which may tend to occur on account of the variations of the loads on the rolls and on account of changes in temperature or the like. By means of this system of operation a constant or predetermined speed relation between the rolls is automatically maintained.

Various modifications of the system are indicated in the accompanying drawings and will be described in detail in connection therewith.

The various objects and advantages of the invention will appear more clear from the following specification taken with the accompanying drawings in which—

Fig. 4 is a diagrammatic illustration of a side elevation of the rolls of a complete paper machine;

Fig. 5 is a diagrammatic illustration of a plan view of a complete paper-making machine.

Figure 1:
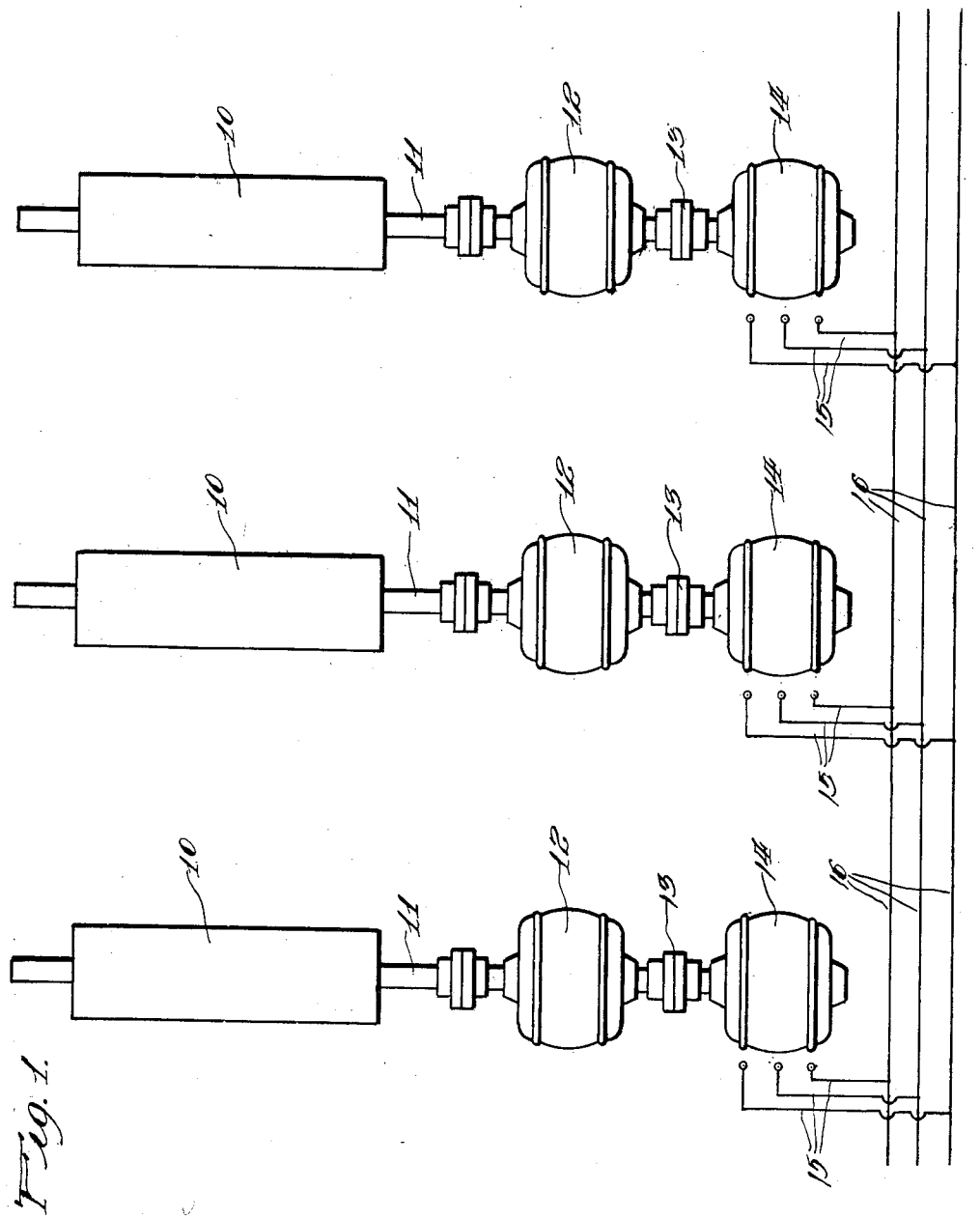
Figure 1 is a diagrammatic illustration of one embodiment or application of the invention in which the alternating current pilot motors are coupled in direct mechanical connection with the direct current motors.

In Fig. 1 of the drawings one application of the invention is shown in connection with a series of rolls 10 of a paper machine. The shafts 11 of these rolls are coupled directly to the shafts of the direct current driving motors 12 which have similar characteristics. The rotors of these motors are connected directly through couplings 13 with the shafts of the alternating current pilot motors 14 which also have similar characteristics. The terminals of each of these motors, which are three-phase synchronous motors, have three wires 15 leading therefrom to the common bus bars or line wires 16 which may be supply wires or merely conductors for tying the motors together electrically. With this arrangement the alternating current synchronous motors 14 run at a constant speed at all loads and overcome or correct any irregularities in speed of the direct current motors 12 to which they are coupled. Upon an undue increase in speed of one of the direct current machines for example, the connected synchronous machine may act for a period as an alternating current generator, driving the other connected alternating current machines as motors. This automatic adjustment of the alternating current machines to the conditions of operation of the direct current motors serves automatically to maintain a constant and uniform speed of the rolls 10.

Figure 2:
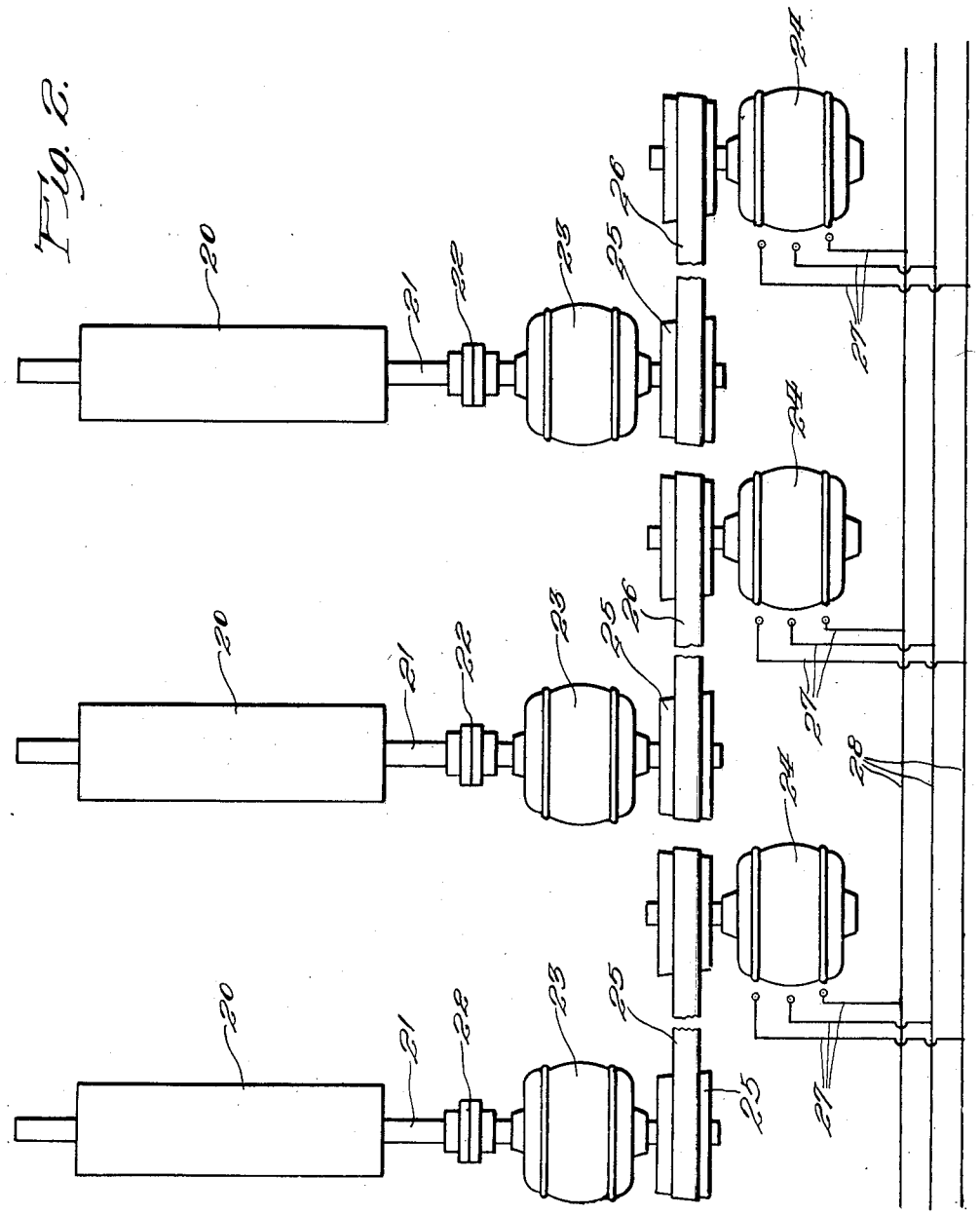
Fig. 2 is a diagrammatic illustration of a second embodiment or application of the invention in which the alternating current pilot motors are tied together electrically, and each of which has a variable speed connection with one of the alternating current motors.

The embodiment of the invention illustrated in Fig. 2 comprises a series of rolls 20 having shafts 21 which are directly connected by couplings 22 to the shafts of the direct current driving motors 23. These driving motors are each connected to one of a series of alternating current synchronous pilot motors 24 through intermediate variable speed connections comprising cone pulleys 25 which are mounted in reverse positions on the shafts of the motors and connected by belts 26. All of the alternating current pilot motors 24 are tied together electrically by means of the individual conductors 27 which are connected to the common bus bars or line wires 28. The operation of this embodiment of the invention is similar to that of the one previously described except that the present arrangement of the apparatus permits a variation in the speed of any one or more of the rolls, which variation is often necessary in order to take up or provide slack in the paper. After adjusting the belts 26 on the cone pulleys, the alternating current machines 24 will serve automatically to maintain the predetermined speed relation between the rolls 20.

Figure 3:
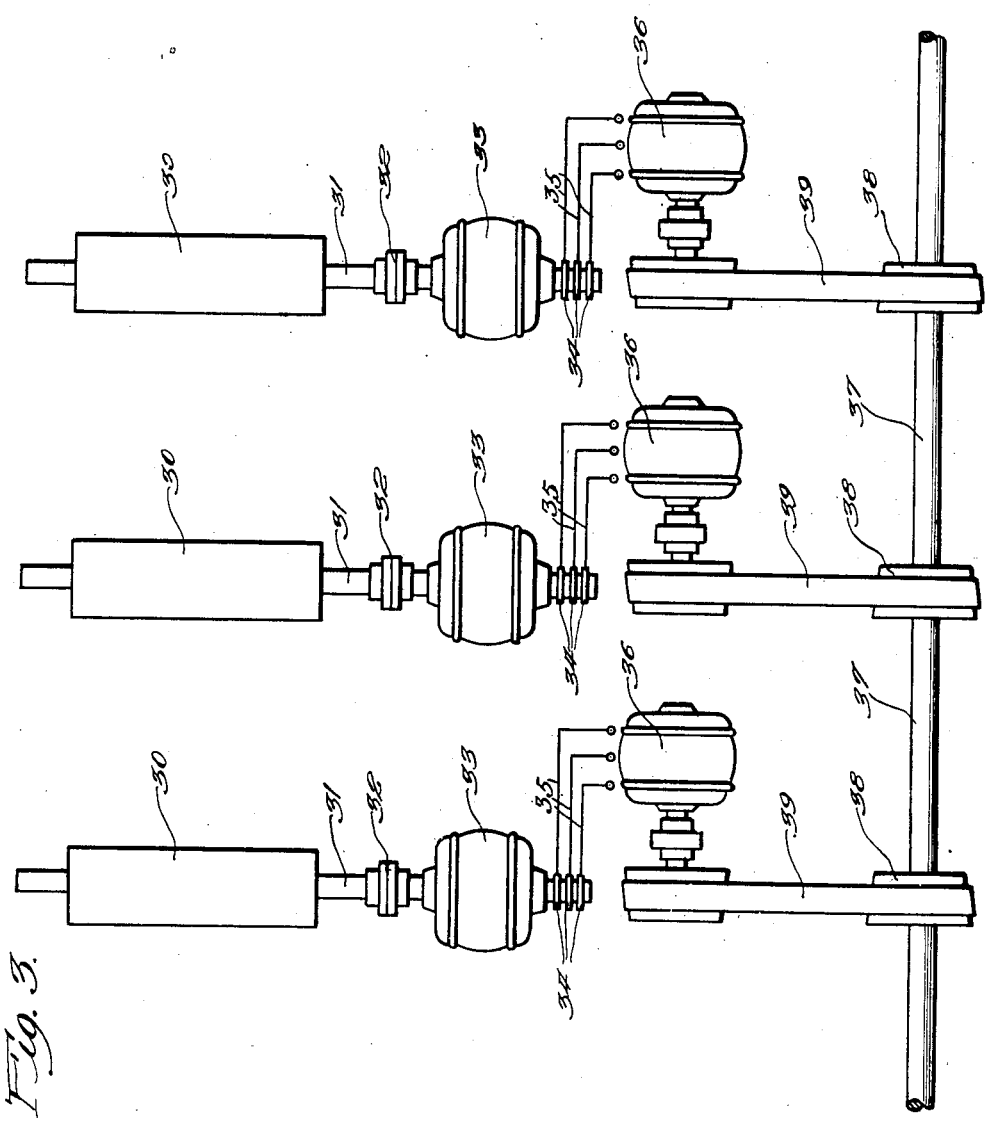
Fig. 3 is a diagrammatic illustration of a third embodiment or application of the invention in which alternating current taps are brought out from the armatures of the direct current motors, these taps being connected to alternating current generators which are coupled together by a variable speed connection.

A third embodiment of the invention illustrated in Fig. 3 comprises a series of rolls 30 having shafts 31 which are directly connected through couplings 32 to the shafts of the direct current driving motors 33. Instead of employing separate alternating current pilot motors, alternating current taps are taken from the armatures of the direct current machines and connected to the slip rings mounted on the shafts of the motors, thus transforming the direct current machines into rotary synchronous converters. These slip rings are connected by conductors 35 to the terminals of alternating generators 36 which, if desired, may be located at some distance from the direct current motors which drive the rolls. These alternating current generators 36 are driven from a line shaft 37 through intermediate cone pulleys 38 mounted in reverse positions on the line shaft and on the shafts of the generators and connected by belts 39. Any one of the belts 39 may be shifted on the pulleys 38 and held in position in any desired manner in order to secure any desired speed of one of the generators. The generators 36 have similar characteristics and their connection with the armatures of the direct current motors 33 serves to control the operation of these motors and maintain the desired relative speeds of the rolls 30. This embodiment of the invention has the advantage that it permits the location of the speed adjusting portion of the apparatus at some distance from the rolls and it also eliminates the use of separate alternating current pilot motors. The shaft 37 is preferably driven from some outside source, but this is not essential since one or more of the machines 36 may operate as alternating current motors, depending upon the speed variations of the direct current machines, and when acting as alternating current motors, the machines 36 will drive the shaft 37. By changing the position of any one of the belts 39, it is possible to change the frequency of the connected alternating current generator and thereby vary the speed of the synchronous converter connected thereto.

Figs. 4 and 5 schematically illustrate a complete paper-making machine. Such a machine includes couch rolls 40, a plurality of press rolls 41, a series of drier rolls 42 and the calender rolls 43. The couch and press rolls have their respective shafts directly connected through gearing 45 with direct-current driving motors 46. The drier rolls 42 are interconnected by means of gearing 47 and are driven by direct-current motors 48 through gearing 49 and shafts 49'. The calender rolls are directly connected through gearing 50 with direct-current driving motors 51. All of the direct-current motors are illustrated as having similar characteristics and are adapted to be operated from a common source of supply. An alternating-current synchronous motor 52 is coupled to each of the motors 46, 48 and 51 through any suitable mechanical connection. As will be hereinafter described, the motors 52 may be tied together through intervening electrical and mechanical connections in several ways to maintain a constant operating speed of, or a predetermined speed ratio between, the rolls of the paper mill.

Figure 6:
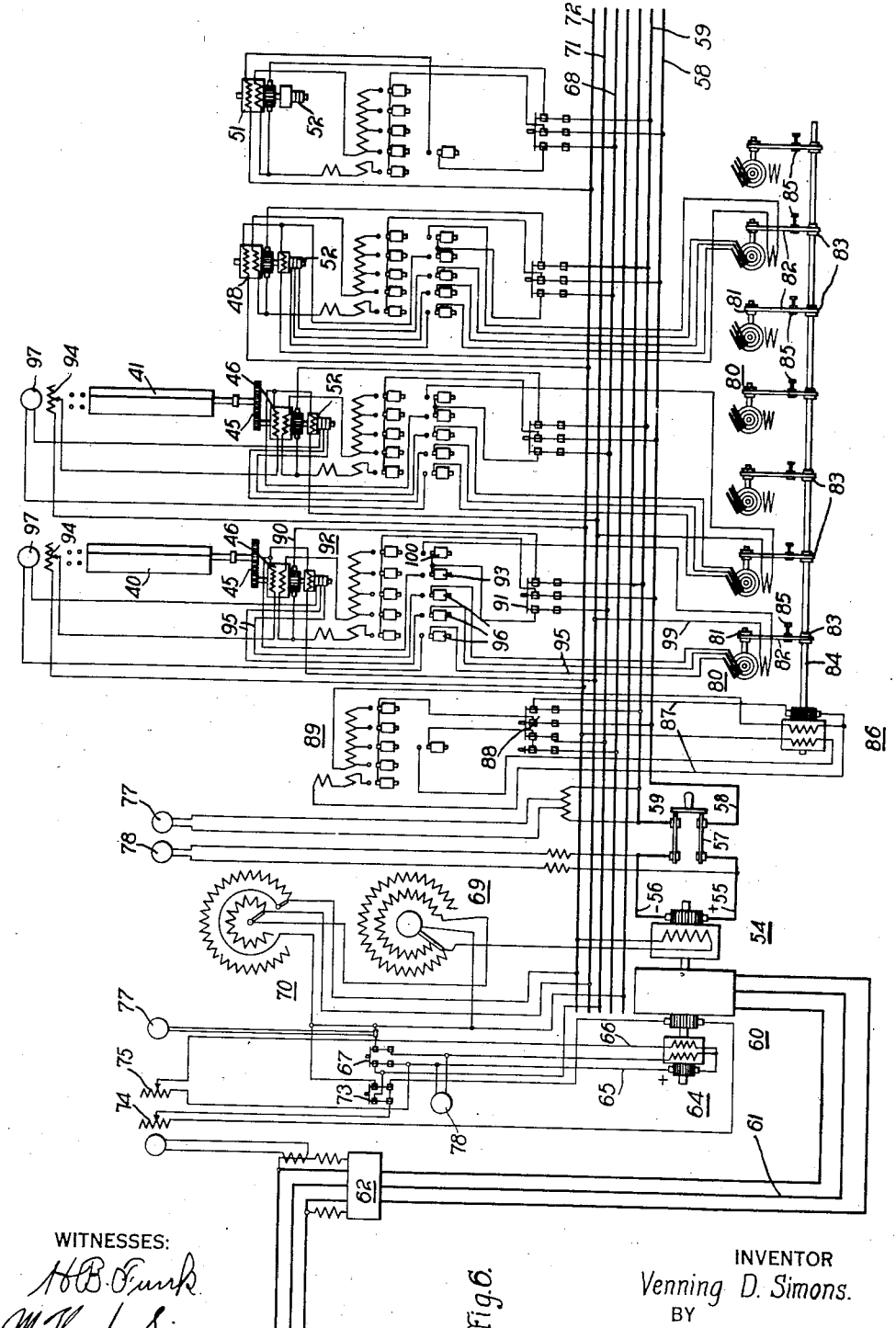
Fig. 6 is a diagrammatic illustration of a complete control system illustrating a further embodiment of the present invention.

Fig. 6 illustrates a more complete control system in connection with an application of the invention to the rolls of a paper machine. The control system is also applicable to the methods of connection illustrated in Figs. 1, 2 and 3. The control system will be described in connection with only one unit, since the parts are substantially duplicated for each unit. Before the control system is described, the main and generating apparatus for the entire plant will be described.

Positive and negative direct-current bus bars 58 and 59 are energized from a direct-current generator 54, having line conductors 55 and 56, connected thereto and to the bus bars 58 and 59 through a switch 57. The generator 54 is driven by a synchronous motor 60 that is connected to an alternating-current supply circuit 61 and has a starting compensator 62 in circuit therewith. An exciter 64 for the generator 54 is also adapted to be driven by the motor 60. A regulating rheostat 75 is included in the shunt field-magnet winding circuit of the exciter 64 through conductor 66. Armature conductor 65 connects with positive bus bar 68 through a switch 67. The opposite terminal of the switch 67 connects through the rheostats 69 and 70 with the bus bars 71 and 72. The field-magnet windings of the alternating-current motors 52 and the direct-current driving motors are each connected to the positive bus bars 68, while bus bars 71 serves as the negative bus bar for the field-magnet windings of the alternating-current motors, and bus bar 72 serves as the negative bus bar for the field-magnet windings of the direct-current motors. One portion of the rheostat 69 is connected in the circuit of the field-magnet winding of generator 54, and one portion of the rheostat 70 is connected in the excitation circuit for the motor 60. An additional rheostat 74 is also connected in the excitation circuit for the motor 60, the circuit to the rheostat 74 including switch 73. Appropriate volt meters 77 and ameters 78 are connected in the various circuits for indicating the voltages and the currents thereof. The purposes and functions of the above-described equipment are so well-known that no detailed discussion thereof will be entered into herein.

One terminal of the direct-current driving motor 46 is connected with the negative bus bar 59 through a conductor 90 and a switch 91, and the other terminal of the motor 46 is connected to the positive bus bar 58 through the electromagnetic regulator 92 and the switch 91. The field-magnet winding of the motor 46 is energized from the bus bars 68—72, the circuit extending through the electromagnetic regulator 93, and a rheostat 94 that is located adjacent the roll 40. The terminals of the alternating-current pilot motor 52 are connected with the terminals of one of the alternating-current generators 80 through conductors 95, electromagnetic regulator 96, and starting switch 97, which is located adjacent the roll 40.

The field-magnet winding of the alternating-current generator 80 is energized from the bus-bars 68—71, the circuit including conductor 99 leading through the electromagnetic regulator 100. A cone pulley 81 is mounted upon the shaft of the generator 80 and has co-operating therewith a belt 82 that engages an oppositely-arranged cone pulley 83. The pulley 83 is mounted on a shaft 84 that is common to each of the roll units. The shaft 84 is driven by a direct-current constant-speed motor 86. The belt 82 may be adjusted and held in position on the pulleys by a device 85, so as to secure speed adjustments for the individual roll units. The motor 86 is connected to bus bars 58 and 59 through conductors 87, an intermediate switch 88 and an electromagnetic regulating rheostat 89. The shunt field circuit of the motor 86 is connected to bus bars 68 and 72.

It will be noted that both of the motors 46 and 52 may be controlled from a position adjacent the roll driven thereby and the pilot motor 52 is electrically connected with one of the alternating-current generators 80. Furthermore, the direct-current motor 46 is driven from the same source of supply as the direct-current motor 86. Since each of the alternating-current synchronous motors 52 is electrically connected to one of the alternating-current generators 80 that are operated from a common shaft, all of the pilot motors 52 are effectually tied together. A predetermined speed relation or ratio may be maintained between the various rolls 40 of one section of the machine, or between the rolls 40 and 41 of the mill, for example, rather than a uniform speed, by varying the positions of one or more of the belts 82 through which the alternating-current generators are driven. Any speed change in any part of the system is thereafter automatically corrected or compensated for by the automatic regulation effected by the described interconnections of the generators 80 and of the pilot motors 52.

The driving of the line shaft 84 by the direct-current motor 86 serves as a convenient means for starting the synchronous machines. The operating speed of the entire mill may be changed by changing the speed of the motor 86, which changes the various frequencies of current delivered by the generators 80 and thus effects a corresponding variation in the speeds of each of the synchronous pilot motors 52. By this operation, the speeds of the direct-current driving motors 46 are caused to correspond to that of the motor 86.

If it be desired to increase the speed of one of the rolls only, the belt 82 which drives the alternator 80 associated with that unit is shifted in order to increase or decrease the speed of the alternator, thereby increasing or decreasing the frequency of the current delivered thereby and correspondingly effecting an increase or decrease in the speed of the associated pilot motor 52.

That is to say, excess load upon the roll is taken by the associate alternating-current pilot motor, while the decrease in load will cause the pilot motor to act as a generator and become additional load for the driving motor.

From the foregoing description, it will be apparent that, if the rolls of the paper-mill are driven by motors associated and connected as indicated in Fig. 1, an increase or decrease in the load upon one roll 10 will be compensated for in accordance with the demand of the associated pilot motor 14 upon the other pilot motors to which it is electrically connected. That is to say, if one of the pilot motors 14, acting as a motor, tends to draw more power from the bus bars 16, the other motors 14 will tend to act as generators and deliver sufficient power to the bus bars 16 to maintain the speeds of the rolls substantially constant. This applies equally to the system of Fig. 2, wherein the variable speed element is introduced. The system of Fig. 3 is a combination of the systems of Figs. 1 and 6, in that alternating-current generators are driven from a common shaft and supply one winding of the synchronous motor driving the rolls.

Although I have shown and described certain embodiments and applications of the invention, it will be understood that these improvements may be employed in various ways without departing from the scope of the appended claims.

I claim:—

1. In combination, a paper machine comprising a plurality of rolls, a plurality of direct-current electric motors adapted to operate said rolls, a plurality of alternating-current synchronous motors each connected to one of said direct-current motors, means for interconnecting said synchronous motors, and means for varying the speed of any selected synchronous motor.

2. In combination, a paper machine comprising a plurality of rolls, a plurality of direct-current electric motors adapted to operate said rolls, a plurality of alternating-current synchronous motors each mechanically connected to one of said direct-current motors, a plurality of alternating-current generators, means for electrically connecting each of said alternating-current generators to one of said synchronous motors, and means for operating said alternating-current generators from a common source.

3. In combination, a paper machine comprising a plurality of rolls, a plurality of direct-current electric motors adapted to operate said rolls, a plurality of alternating-current synchronous motors each mechanically connected to one of said direct-current motors, a plurality of alternating-current generators, means for electrically connecting each of said alternating-current generators to one of said synchronous motors, a driving shaft and means for adjustably connecting said driving shaft to each of said generators.

4. In combination, a paper machine comprising a plurality of rolls, a plurality of direct-current electric motors adapted to operate said rolls, a plurality of alternating-current synchronous motors each mechanically connected to one of said direct-current motors, a plurality of alternating-current generators, means for electrically connecting each of said alternating-current generators to one of said synchronous motors, a driving shaft, means for adjustably connecting said driving shaft to each of said generators, and a direct-current motor for operating said driving shaft.

5. In a speed-regulator system, the combination with a plurality of rotatable members and driving motors therefor, of a plurality of dynamo-electric machines associated with said driving motors, means for mechanically interconnecting said machines, and means for varying the speeds of said machines individually whereby a substantially constant speed ratio may be maintained between said rotatable members.

6. In a speed-regulator system, the combination with a plurality of rotatable members and driving motors therefor, of a plurality of dynamo-electric machines associated with said driving motors, means for mechanically interconnecting said machines, means for varying the speeds of the individual rotatable members, and additional means for simultaneously varying the speeds of all rotatable members.

7. In a speed-regulator system, the combination with a plurality of rotatable members and driving motors therefor, of a plurality of dynamo-electric machines connected to said driving motors, a second set of dynamo-electric machines respectively connected to the first-mentioned machines, speed-varying means associated with said last-mentioned machines and a common operating means for said speed-varying means.

8. In a speed-regulator system, the combination with a plurality of rotatable members and driving motors therefor, of a plurality of dynamo-electric machines respectively mechanically connected with said driving motors, means for electrically and mechanically interconnecting said machines, and additional means associated with said motors for varying the speed of the individual members whereby a substantially constant speed ratio may be maintained between said rotatable members.

9. In a speed-regulator system, the combination with a plurality of rotatable members and driving motors therefor, of a plurality of dynamo-electric machines respectively mechanically connected with said driving motors, means for interconnecting said machines, additional means associated with said motors for varying the speed of the individual members and a dynamo-electric machine adapted to operate said speed-varying means whereby the speeds of all of the rotatable members may be simultaneously changed.

10. In a speed-regulator system, the combination with a plurality of rotatable members and driving motors therefor, of a plurality of dynamo-electric machines respectively mechanically connected to said driving motors, a second set of dynamo-electric machines respectively electrically connected to the first-mentioned machines, means for mechanically interconnecting said second set of machines and adapted to vary the speed of the individual members and a common operating member for said speed-varying means.

In testimony whereof, I have subscribed my name.

VENNING D. SIMONS.